(12) United States Patent
Roux et al.

(10) Patent No.: US 6,337,985 B1
(45) Date of Patent: Jan. 8, 2002

(54) METHOD TO MODIFY A CURRENT TRANSMITTED POWER DISTRIBUTION IN CASE OF MACRO-DIVERSITY AND CORRESPONDING MOBILE STATION

(75) Inventors: Pierre Roux, Argenteuuil; Christophe Cordier, Paris; Alejandro De Hoz Garcia-Bellido, Boulogne-Billancourt, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/364,309

(22) Filed: Jul. 30, 1999

(30) Foreign Application Priority Data

Jul. 9, 1999 (EP) .......................................... 99 440 185

(51) Int. Cl.$^7$ ................................................ H04Q 7/20
(52) U.S. Cl. .......................... 455/442; 455/522; 455/69
(58) Field of Search ................................ 455/599, 449, 455/69, 440, 444

(56) References Cited

U.S. PATENT DOCUMENTS 5,933,782 A * 9/1999 Nakano et al. ............. 455/522
6,144,861 A * 11/2000 Sundelin et al. ............ 455/522
6,173,162 B1 * 1/2001 Dalhman et al. ............ 455/69

* cited by examiner

Primary Examiner—Nguyen T. Vo
Assistant Examiner—Nghi Ly
(74) Attorney, Agent, or Firm—Sughrue Mion, PLLC

(57) ABSTRACT

This invention relates to a method of modifying a current transmitted power distribution used by at least two base stations transmitting a signal to a mobile station on the macro-diversity principle. A mobile station using this method is also disclosed. According to the invention, the method consists substituting the current transmitted power distribution by a new transmitted power distribution, selected among several hypothetical transmitted power distributions, under the condition that this new transmitted power distribution provides a better quality of service at the mobile station than the current one.

7 Claims, 1 Drawing Sheet

METHOD TO MODIFY A CURRENT TRANSMITTED POWER DISTRIBUTION IN CASE OF MACRO-DIVERSITY AND CORRESPONDING MOBILE STATION

BACKGROUND OF THE INVENTION

The present invention relates to the use of downlink macro-diversity in a digital radio communication network. More precisely the present invention relates to a method of modifying the transmitted power distribution used by base stations transmitting a signal to a mobile station on the macro-diversity principle and to a mobile station for receiving such a signal.

Downlink macro-diversity consists in a principle according to which a mobile station receives several copies of a same signal from a set of base stations, called active set. In this situation, the mobile station is supposed to combine all received signals in order to achieve the maximum possible diversity effect. Whatever a fading on one link between the mobile station and a base station, the connection doesn't break thanks to the subsequent links between the mobile station and the other base stations.

Downlink macro diversity is especially used when a mobile station is in a soft handover state.

Usually, the total power to be transmitted to the mobile station is determined by a common entity controlling the base stations, according to power control procedures. The distribution of the total power among the base stations belonging to the active set corresponds simply to similar relative powers transmitted by all the base stations. Then if $P_{tot}$ is the total power to be transmitted, $P_{tot}/N$ will be the relative power transmitted by all the N base stations belonging to the active set.

This solution assumes that all base stations belonging to the active set are in similar conditions to reach the mobile station. Actually, in such a case, the optimum diversity effect is obtained when all base stations transmit a similar relative power to the mobile station. The quality of service experienced at the mobile station is optimum. However, when the base stations belonging to the active set experience different transmitting conditions to reach the mobile station, such a simple solution shows no more an optimum quality of service at the mobile station.

SUMMARY OF THE INVENTION

It is an object of the invention to provide a method to take into account the different transmitting conditions for the base stations to reach the mobile station and to optimize the quality of service for the signal received with diversity at the mobile station.

These and other objects of the invention are attained by a method of modifying a current transmitted power distribution used by at least two base stations transmitting a signal to a mobile station on the macro-diversity principle, said method comprising the steps of: (i) measuring, at said mobile station, a quantity related to the signal to interference ratio for the part of said signal transmitted by each base station; (ii) processing some values by weighting and summing said measured quantities, a set of weighting coefficients corresponding to one hypothetical transmitted power distribution supposed to have been used by said base stations in place of said current transmitted power distribution; (iii) associating to each of said values, a value of a quality of service according to a known function; and (iv) replacing said current transmitted power distribution by one of said hypothetical transmitted power distributions providing a better value of quality of service than said current transmitted power distribution.

In accordance with a further aspect of the invention, there is provided a mobile station belonging to a digital radio communication system, said mobile station being able to receive a signal from at least two base stations performing macro-diversity, a current transmitted power distribution being used by said base stations, said mobile station comprising means to measure a quantity related to the signal to interference ratio for the part of said signal transmitted by each base station, said mobile station being characterized in that it further comprises: means to process some values by weighting and summing said measured quantities, a set of coefficients corresponding to one hypothetical transmitted power distribution supposed to have been used by said base stations in place of said current transmitted power distribution; means to associate to each of said values a value of a quality of service according to a known function; means to select a new transmitted power distribution among said hypothetical transmitted power distributions providing a better value of quality of service than said current transmitted power distribution; and means to send a request for said base stations to use the new transmitted power distribution.

Further advantageous features of the invention will be apparent from the description below and the appended claims.

BRIEF DESCRIPTION OF THE DRAWINGS

The invention will become more transparent from the following description of several embodiments when taken in conjunction with the accompanying drawing, in which.

DETAILED DESCRIPTION OF THE INVENTION

Figure 1:
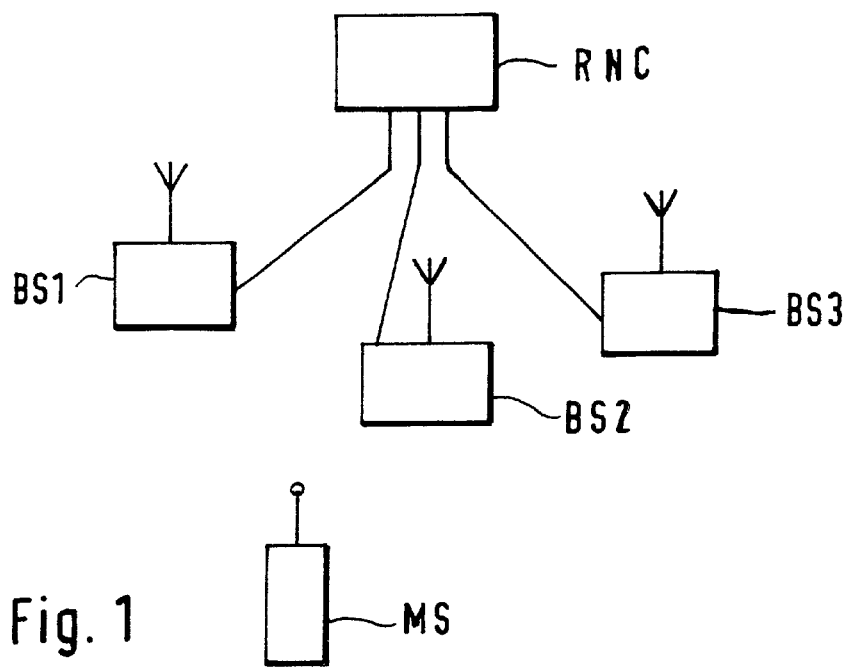
FIG. 1 shows a digital radio communication network comprising three base stations belonging to the active set of a mobile station.

In a preferred embodiment the method underlying the invention is used in a digital radio communication network as showed in FIG. 1. The digital radio communication network comprises a mobile station MS, three base station BS1, BS2, BS3 and a radio network controller, RNC, controlling the three base stations. Downlink communication is based on the macro-diversity principle, that means that the same content of signal is transmitted from the base stations BS1, BS2, BS3 toward the mobile station MS. The power transmitted by the base stations BS1, BS2, BS3 is respectively equal to $a_1P$, $a_2P$, $a_3P$, if P is the total transmitted power to be distributed among the base stations BS1, BS2, BS3 and the coefficients $a_1$, $a_2$, $a_3$ verify $a_1+a_2+a_3=1$. The triplet ($a_1$, $a_2$, $a_3$) represents the current transmitted power distribution used by the bases stations BS1, BS2, BS3.

According to the invention, the method consists, in a first step (i), in measuring at the mobile station MS a quantity related to the signal to interference ratio for the part of the signal transmitted by each base station BS1, BS2, BS3. The quantity related to the signal to interference ratio may be the signal to interference ratio itself, SIR, or any other quantity which can be derived from it. In one embodiment of the invention, the energy per bit divided by the noise spectral density, Eb/No, which is linearly dependant of the SIR, could also be measured at the mobile station MS and be considered as a quantity related to the signal to interference ratio.

In the following description, the measured quantities will be assumed to be SIRs. $SIR_1$, $SIR_2$, $SIR_3$ are respectively the measured SIRs for the part of signal received from BS1, BS2, BS3. If maximum ratio combining is used, then the total SIR, called $SIR_{tot}$, experienced at the mobile station MS for the totality of the signal according to the current transmitted power distribution, is obtained as follows: $SIR_{tot} = SIR_1 + SIR_2 + SIR_3$.

In a second step (ii), the method consists in processing values by weighting and summing the measured values $SIR_1$, $SIR_2$, $SIR_3$. Each processed value represents the total SIR of the signal, that would have been experienced at the mobile station MS, if a predefined transmitted power distribution characterized by the triplet ($\alpha_{hyp(j)1}$, $\alpha_{hyp(j)2}$, $\alpha_{hyp(j)3}$), called hypothetical distribution, had been used by the base stations BS1, BS2, BS3. The index j refers to one hypothetical distribution belonging to a set of hypothetical distributions. One processed value is called $SIR_{hyp(j)tot}$, the index j referring to the used hypothetical transmitted power distribution. The weighting factors applied to $SIR_1$, $SIR_2$, $SIR_3$ are meant to substitute the effects of the current transmitted power distribution by the effects of the used hypothetical transmitted power distribution supposed to have been used by the base stations BS1, BS2, BS3 in place of the current transmitted power distribution.

In the embodiment being described, the relation between $SIR_{hyp(j)tot}$ and $SIR_1$, $SIR_2$, $SIR_3$ is as follows:

$$SIR_{hyp(j)tot} = \sum_{k=1}^{3} \frac{a_{hyp(j)k}}{a_k} \cdot SIR_k$$

The weighting coefficients corresponding to the hypothetical transmitted power distribution j and associated to $SIR_k$ for $1 \leq k \leq 3$ are equal to $$\frac{a_{hyp(j)k}}{a_k}.$$

The set of hypothetical distributions to be defined depend on the precision to be achieved. The higher the precision to be achieved, the more different hypothetical distributions have to be defined. In the embodiment being described, an increment $\Delta$ is chosen and each hypothetical distribution is characterized by a triplet ($\alpha_{hyp(j)1}$, $\alpha_{hyp(j)2}$, $\alpha_{hyp(j)3}$), verifying:

$$\begin{cases} a_{hyp(j)1} = a_1 + k_1 \cdot \Delta \\ a_{hyp(j)2} = a_2 + k_2 \cdot \Delta \\ a_{hyp(j)3} = a_3 + k_3 \cdot \Delta \end{cases}$$

where a $hyp(j)1 \geq 0$, a $_{hyp(j)2} \geq 0$, a $_{hyp(j)3} > 0$
and $k_1 + k_2 + k_3 = 0$
and $k_1$, $k_2$, $k_3$ are signed integers
A subset of the set defined above can also be used.

For example, if ($a_1$, $a_2$, $a_3$) is equal to (1/3,1/3,1/3) and to $\Delta = 1/6$, the hypothetical distributions are characterized by the following two families of triplets containing each one six different possibilities:

| first family | second family |
|---|---|
| (1/3, 1/6, 1/2), | (1/3, 0, 2/3), |
| (1/6, 1/3, 1/2), | (1/3, 2/3, 0), |
| (1/3, 1/2, 1/6), | (0, 1/3, 2/3), |
| (1/6, 1/2, 1/3), | (0, 2/3, 1/3), |
| (1/2, 1/6, 1/3), | (2/3, 0, 1/3), |
| (1/2, 1/3, 1/6) | (2/3, 1/3, 0) |

In a third step (iii), the method consists in associating to each of $SIR_{hyp(j)tot}$ obtained for an hypothetical distribution a value of quality of service according to a predefined function. The quality of service can be represented by a symbol error rate, a bit error rate or a frame error rate.

In the embodiment being described, the predefined function used to realize the association, associates values of signal to interference ratio in dB to symbol error rates. An example of a table giving some values of the predefined function is given below. The table is obtained by measurements or simulation done at the target system.

| SIR (dB) | Symbol error rate |
|---|---|
| 0 | 0.15 |
| 1 | 0.09 |
| 2 | 0.05 |
| 3 | 0.03 |
| 4 | 0.015 |
| 5 | 0.007 |
| 6 | 0.003 |
| 7 | 0.001 |
| 8 | 0.0002 |

For a value of SIR in between, the symbol error rate can be obtained by interpolation.

The fourth step (iv) of the method consists in substituting the current transmitted power distribution ($a_1$, $a_2$, $a_3$) by an hypothetical transmitted power distribution providing a better value of quality of service than the current transmitted power distribution. In the embodiment being described, the hypothetical transmitted power distribution providing the best value of quality of service is selected to substitute the current transmitted power distribution. If no hypothetical transmitted power distribution provides a better value of quality of service, the current transmitted power distribution is used further. The value of quality of service associated to the current transmitted power distribution is obtained by associating to $SIRtot = SIR_1 + SIR_2 + SIR_3$ a symbol error rate according to the same known function as described above.

In a preferred embodiment of the invention, a measurement period, MEAS, is defined. During this measurement period, MEAS, the sequence of the first, second and third steps (i), (ii), (iii) of the method is repeated a predefined number of times, for example at regular time intervals. For each execution of the sequence and for each hypothetical distribution, a value of quality of service is stored. At the end of the measurement period, MEAS, the set of stored values of quality of service, obtained for one hypothetical distribution, are averaged. An averaged value of quality of service is assigned to each hypothetical transmitted power distribution. These averaged values of quality of service are then used to execute the fourth step (iv) of the method, that means to select, if one exists, an hypothetical transmitted power distribution whose averaged value of quality of service is better than the averaged value of quality of service of the current transmitted power distribution.

The fourth step (iv) is in the preferred embodiment of the invention executed during a time period, IDLE, following the measurement period MEAS. The two types of periods alternate.

In the preferred embodiment of the invention, the first, second and third steps of the method are executed in the mobile station MS.

Figure 2:
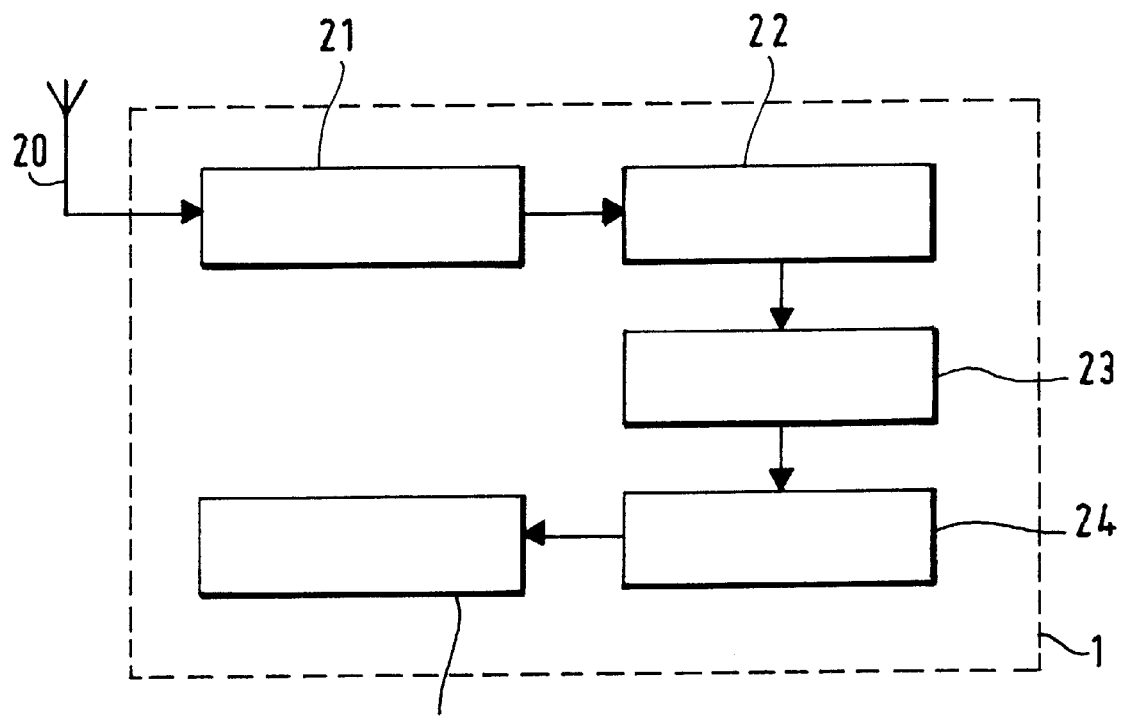
FIG. 2 shows the structure of a mobile station according to the invention.

FIG. 2 shows the structure of the mobile station MS according to the invention. The mobile station MS comprises an antenna 20 to receive the signal coming from the base stations belonging to its active set and means 21 to measure a quantity related to the interference to signal ratio for the part of the signal received from the different base stations. As already mentioned, this quantity can be a SIR, a Eb/No or a quantity directly dependant of the signal to interference ratio. The means 21 deliver the measured quantities to means 22 to process some values by weighting and summing the measured quantities. The means 22 execute the second step of the above described method. The means 22 are connected to means 23 to associate to each processed value a value of quality of service as described in the third step of the above described method. The means 23 are connected to means 24 to select a new transmitted power distribution among the hypothetical distributions providing a better value of quality of service than the current transmitted power distribution. Once the new transmitted power distribution is selected by the means 24, the latter provide the references of the new transmitted power distribution to means 25. The means 25 generate a request for making the base stations BS1, BS2, BS3 use the new transmitted power distribution. The means 22, 23, 24 and 25 are located in a processor.

In the embodiment being described, the means 25 generate a message comprising the triplet corresponding to the new transmitted power distribution. This message is transmitted to a base station with which the mobile station communicates in the uplink. This base station relays transparently the message to a central entity controlling the base stations. In a CDMA system, this central entity is the Radio Network Controller, RNC, which is controlling the macro-diversity. The RNC extracts the triplet corresponding to the new transmitted power distribution from the message and generates a request to the base stations BS1, BS2, BS3 indicating the new power to be transmitted by each base station.

In another embodiment of the invention, the mobile station would address directly each base station BS1, BS2, BS3 of its active set so that each base station adopt a new appropriate transmitted power determined by the new power distribution.

The description can, of course, be adapted to each number of base stations belonging to the active set of a mobile station.

This method is especially applicable to CDMA networks. For such networks, the performance is closely dependent on an accurate power control that is expected to minimize the interference between the users. The disclosed method looks, in case of downlink macro-diversity, for reaching a transmitted power distribution optimizing the quality of service at a mobile station. Then, thanks to an appropriate transmitted power distribution, a target quality of service is obtained with a lower total transmitted power. As a consequence, such a method also contributes to improve the performance of CDMA networks.

What is claimed is:

1. A method to modify a current transmitted power distribution used by at least two base stations transmitting a signal to a mobile station on the macro-diversity principle, characterized in that said method comprises:
   i—measuring, at said mobile station, a quantity related to the signal to interference ratio for the part of said signal transmitted by each base station;
   ii—processing some values by weighting and summing said measured quantities, a set of weighting coefficients corresponding to one hypothetical transmitted power distribution supposed to have been used by said base stations in place of said current transmitted power distribution;
   iii—associating to each of said values, a value of a quality of service according to a known function;
   iv—replacing said current transmitted power distribution by one of said hypothetical transmitted power distributions providing a better value of quality of service than said current transmitted power distribution.

2. A method according to claim 1, characterized in that one of said processed values, noted $SIR_{hyp(j)tot}$, obtained with said set of weighting coefficients corresponding to one hypothetical distribution, is computed as follows:

$$SIR_{hyp(j)tot} = \sum_{k=1}^{N} \frac{a_{hyp(j)k}}{a_k} \cdot SIR_k$$

where:
   N is the total number of said base stations
   $SIR_k$ represents said measured quantity for said base station number k
   $a_k$ represents the part of signal assigned to said base station k according to said current transmitted power distribution
   $\alpha_{hyp(j)k}$ represents the part of signal assigned to said base station k according to said hypothetical distribution.

3. A method according to claim 1, characterized in that the sequence of steps i, ii, iii is executed a predefined number of times during a measurement period, an averaged value of quality of service being calculated over the measurement period for each one of said hypothetical distributions.

4. A method according to claim 1, characterized in that said measurement period alternates with a time period reserved for the execution of said step iv.

5. A method according to claim 1, characterized in that said value of quality of service is a symbol error rate.

6. A mobile station belonging to a digital radio communication system, said mobile station being able to receive a signal from at least two base stations performing macrodiversity, a current transmitted power distribution being used by said base stations, said mobile station comprising means to measure a quantity related to the signal to interference ratio for the part of said signal transmitted by each base station, said mobile station being characterized in that it comprises also:

> means to process some values by weighting and summing said measured quantities, a set of coefficients corresponding to one hypothetical transmitted power distribution supposed to have been used by said base stations in place of said current transmitted power distribution;
>
> means to associate to each of said values a value of a quality of service according to a known function;
>
> means to select a new transmitted power distribution among said hypothetical transmitted power distributions providing a better value of quality of service than said current transmitted power distribution;
>
> means to send a request for said base stations to use the new transmitted power distribution.

7. A mobile station according to claim 6, characterized in that said request is sent to a central entity controlling said base stations.

* * * * *